United States Patent
Shiratsuchi et al.

(10) Patent No.: US 9,436,001 B2
(45) Date of Patent: Sep. 6, 2016

(54) LIGHT BEAM SCANNER

(71) Applicant: Kabushiki Kaisha Toshiba, Minato-ku, Tokyo (JP)

(72) Inventors: Masataka Shiratsuchi, Kanagawa (JP); Masatoshi Hirono, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/753,687

(22) Filed: Jun. 29, 2015

(65) Prior Publication Data

US 2015/0378150 A1 Dec. 31, 2015

(30) Foreign Application Priority Data

Jun. 30, 2014 (JP) ................. 2014-135008

(51) Int. Cl.
G02B 26/08 (2006.01)
G02B 26/10 (2006.01)

(52) U.S. Cl.
CPC .................. *G02B 26/101* (2013.01)

(58) Field of Classification Search
CPC ............ G02B 26/101; G02B 26/0816; G02B 26/105
USPC ................. 359/201.1–202.1, 205.1
See application file for complete search history.

(56) References Cited

U.S. PATENT DOCUMENTS 3,612,642 A * 10/1971 Dostal ................ G02B 26/0816
310/36
2002/0167709 A1 11/2002 Sowa et al.
2013/0286456 A1 10/2013 Cooper
2014/0002825 A1 1/2014 Kawate et al.
2014/0333906 A1 11/2014 Hirono et al.

FOREIGN PATENT DOCUMENTS

| JP | 4-52618 | 2/1992 |
|---|---|---|
| JP | 5-34733 | 2/1993 |
| JP | 2002-48998 | 2/2002 |
| JP | 2002-277784 | 9/2002 |
| JP | 2002-365582 | 12/2002 |
| JP | 2007-33975 | 2/2007 |
| JP | 2011-112804 | 6/2011 |
| JP | 2012-185121 | 9/2012 |
| JP | 2014-505903 | 3/2014 |
| JP | 2014-219565 | 11/2014 |
| WO | WO 2013/046904 A1 | 4/2013 |

* cited by examiner

*Primary Examiner* — James Phan
(74) *Attorney, Agent, or Firm* — Finnegan, Henderson, Farabow, Garrett & Dunner LLP (57) ABSTRACT

According to an embodiment, a light beam scanner includes a first mirror and an angular magnification unit. The first mirror makes a normal direction of a reflecting surface change repeatedly. The angular magnification unit is configured to return, when viewed from a first direction, reflected light from the first mirror to the first mirror so that light is reflected at substantially the same points on the first mirror for a plural number of times, and increase, when viewed from the first direction, an angle each time light is reflected from the first mirror, the angle being between the normal direction of the reflecting surface and a reflection direction of light. Light is emitted from the angular magnification unit after the light is reflected from the first mirror for a predetermined number of times.

10 Claims, 10 Drawing Sheets

LIGHT BEAM SCANNER

CROSS-REFERENCE TO RELATED APPLICATIONS

This application is based upon and claims the benefit of priority from Japanese Patent Application No. 2014-135008, filed on Jun. 30, 2014; the entire contents of which are incorporated herein by reference.

FIELD

Embodiments described herein relate generally to a light beam scanner.

BACKGROUND

Typically, a light beam scanner is known that includes lenses for expanding the scanning range of light beams.

It would be a significant achievement to be able to obtain a light beam scanner that is newly configured by reducing or improving upon the disadvantages in the conventional technology.

DETAILED DESCRIPTION

According to an embodiment, a light beam scanner includes a first mirror and an angular magnification unit. The first mirror makes a normal direction of a reflecting surface change repeatedly. The angular magnification unit is configured to return, when viewed from a first direction, reflected light from the first mirror to the first mirror so that light is reflected at substantially the same points on the first mirror for a plural number of times, and increase, when viewed from the first direction, an angle each time light is reflected from the first mirror, the angle being between the normal direction of the reflecting surface and a reflection direction of light. Light is emitted from the angular magnification unit after the light is reflected from the first mirror for a predetermined number of times.

Exemplary embodiments are described below. Herein, configurations and controls (the technical features) described in the embodiments, as well as functionality and results (the effect) achieved due to the configurations and the controls are only exemplary. Moreover, in a plurality of embodiments described below, identical constituent elements are included. Such identical constituent elements are referred to by the same reference numerals, and the relevant explanation is not repeated.

First Embodiment

Figure 1:
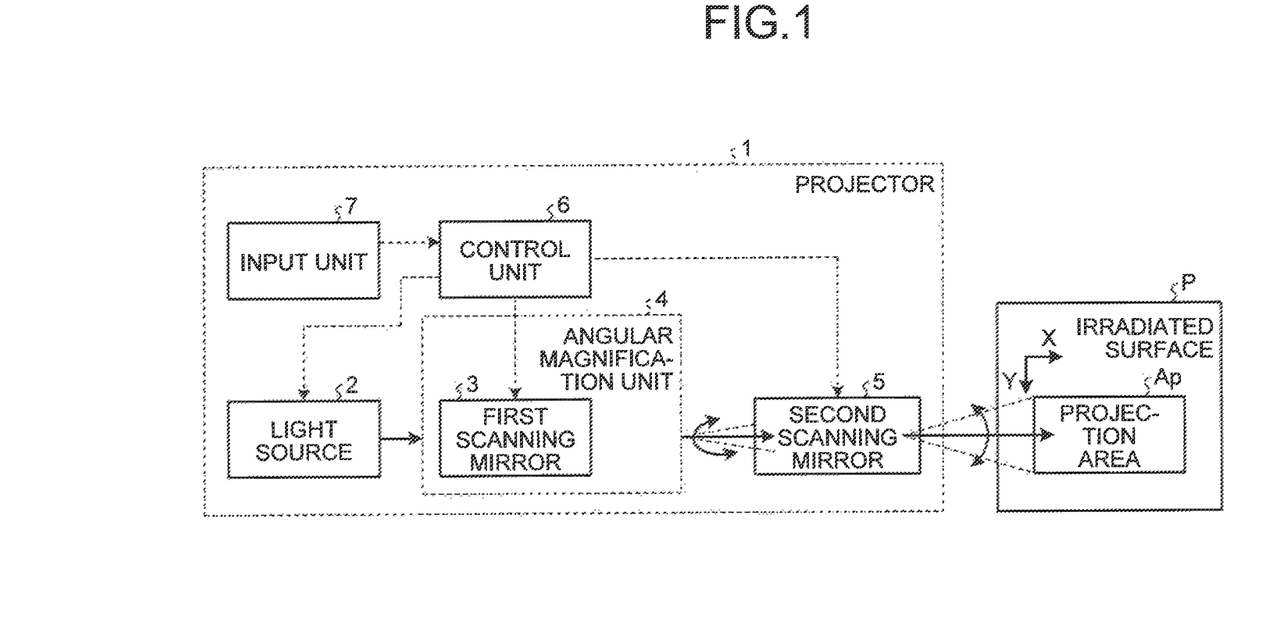
FIG. 1 is an explanatory diagram illustrating an overall configuration of a light beam scanner according to a first embodiment.

As illustrated in FIG. 1, a projector 1 exposes an irradiated surface P, such as a screen, to light beams. On the irradiated surface P, the irradiation position of light beams varies in the X direction and the Y direction that are mutually orthogonal (cross) directions. More particularly, the irradiation position moves in a reciprocating manner in the X direction and moves gradually from a first side (for example, the upper side) to a second side (for example, the lower side) in the Y direction. Then, once the reciprocating movement of the irradiation position ends at the end portion of the second side (for example, at the lower end) in the Y direction; the irradiation position is moved to the end portion at the first side (for example, at the upper end) in the Y direction. Then, the irradiation position again gradually moves from the first side to the second side in the Y direction while moving in a reciprocating manner in the X direction. Such variation in the irradiation position occurs in a repeated manner.

The projector 1 varies the outgoing direction of light beams and causes the abovementioned movements (variation) of the irradiation position within a two-dimensional area (a projection area Ap) on the irradiated surface P. That is, the projector 1 is an example of a light beam scanner. Meanwhile, as far as the light beams are concerned, laser light is used, for example. However, that is not the only possible case.

As illustrated in FIG. 1, the projector 1 includes a light source 2, a first scanning mirror 3, an angular magnification unit 4, a second scanning mirror 5, a control unit 6, and an input unit 7.

The light source 2 is, for example, a semiconductor laser element or a solid-state laser element that emits laser light. Herein, the light source 2 is controlled by the control unit 6, and can emit light according to video signals.

The first scanning mirror 3 repetitively deflects light beams substantially along the X direction (for example, the longitudinal direction or the horizontal direction). The second scanning mirror 5 repetitively deflects light beams substantially along the Y direction (for example, the short direction or the vertical direction). Herein, the first scanning mirror 3 as well as the second scanning mirror 5 is an example of a movable mirror, a vibration mirror, or an oscillation mirror such as MEMS mirror (MEMS stands for micro electro mechanical systems) or a galvanometer mirror. Moreover, the first scanning mirror 3 as well as the second scanning mirror 5 includes a movable mirror unit (not illustrated) and a driving unit (not illustrated) that drives the movable mirror unit. Each movable mirror unit is rotatable (oscillatable) around the rotation center thereof. However, the rotation center of the movable mirror unit in the first scanning mirror 3 and the rotation center of the movable mirror unit in the second scanning mirror 5 extend in different directions from each other (i.e., are in the skew position). More particularly, the rotation center of the movable mirror unit in the first scanning mirror 3 is oriented substantially along the Y direction, while the rotation center of the movable mirror unit in the second scanning mirror 5 is oriented substantially along the X direction. The driving unit electromagnetically moves the corresponding movable mirror unit according to control signals sent by the control unit 6. Meanwhile, the first scanning mirror 3 is an example of a first mirror.

The first scanning mirror 3 is placed subsequent to the light source 2, while the second scanning mirror 5 is placed subsequent to the first scanning mirror 3. Thus, the first scanning mirror 3 repetitively deflects, along the X direction, the light beams emitted from the light source 2. The second scanning mirror 5 repetitively deflects, substantially along the Y direction (for example, perpendicular direction), the light beams that have been repetitively deflected along the X direction by the first scanning mirror 3. Meanwhile, the first scanning mirror 3 has a higher frequency of oscillation (repetition) than the frequency of oscillation (repetition) of the second scanning mirror 5.

The control unit 6 controls the driving units (not illustrated) of the first scanning mirror 3 and the second scanning mirror 5. Moreover, the control unit 6 controls the light source 2. The control unit 6 includes, for example, a central processing unit (CPU) and a driving circuit. Meanwhile, a driving circuit can also be disposed in each constituent element controlled by the control unit 6.

The input unit 7 is a switch, a button, a knob, or a touch-sensitive panel. According to an operation performed using the input unit 7, the control unit 6 controls the constituent elements.

The angular magnification unit 4 is able to expand the range of the deflection angle caused in the X direction of the optical path due to the first scanning mirror 3, that is, able to expand the degree of vibration caused in the X direction of the optical path due to the first scanning mirror 3. The deflection angle represents the angle of deflection. As a result of using the angular magnification unit 4, the range of the deflection angle becomes larger as compared to, for example, the case in which the angular magnification unit 4 is not included. Moreover, as compared to a configuration in which the same range of the deflection angle of light is achieved without using the angular magnification unit 4, the use of the angular magnification unit 4 not only enables performing setting of a smaller angular variation of the first scanning mirror 3 with ease but also enables performing setting of a higher vibrational frequency of the first scanning mirror 3 with ease.

Figure 2:
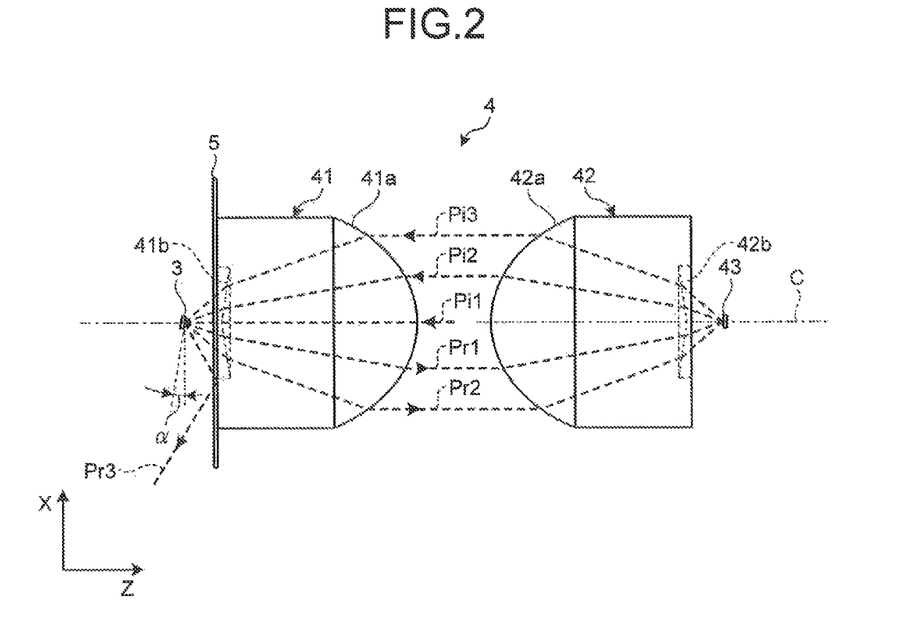
FIG. 2 is a side view, when viewed from the Y direction, of an angular magnification unit illustrated in FIG. 1.
Figure 3:
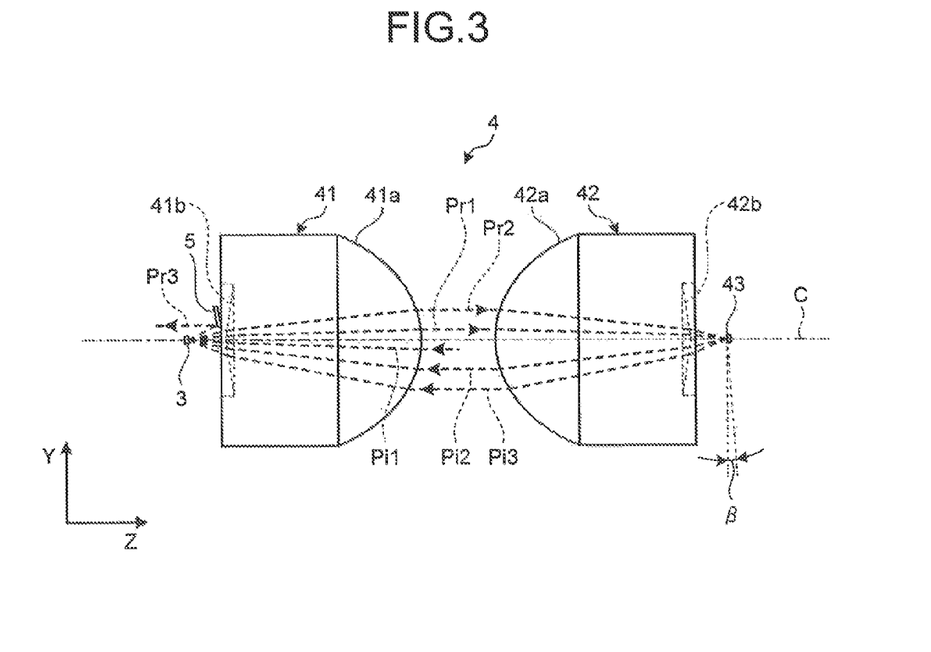
FIG. 3 is a side view, when viewed from the X direction, of the angular magnification unit illustrated in FIG. 1.
Figure 4:
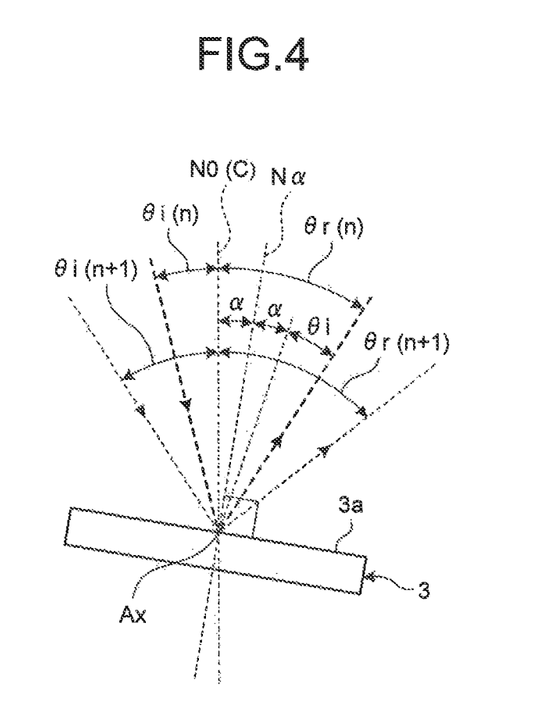
FIG. 4 is an explanatory diagram illustrating reflection of light from a first scanning mirror illustrated in FIG. 1.

As illustrated in FIGS. 2 and 3, the angular magnification unit 4 includes the first scanning mirror 3, a lens 41, a lens 42, a mirror 43, and the second scanning mirror 5. The angular magnification unit 4 magnifies the outgoing angle of the light using the first scanning mirror 3. The concerned principle is explained with reference to FIGS. 4 and 5. As illustrated in FIG. 4, the first scanning mirror 3 is, for example, a planar mirror and is disposed to be rotatable (oscillatable) around a rotation center Ax that is perpendicular to the plane of FIG. 4. In the example illustrated in FIG. 4, a normal direction N$\alpha$ of the first scanning mirror 3 is inclined by an angle $\alpha$ (an inclination angle representing an angle of inclination) in the clockwise direction with respect to a normal direction N0 of the first scanning mirror 3 at a neutral position (a reference position or a center position). Herein, an incidence angle $\theta i$ of light being incident on the first scanning mirror 3 is defined as an angle in the counterclockwise direction with respect to the normal direction N0 at the neutral position of the first scanning mirror 3; and a reflection angle $\theta r$ of light reflected from the first scanning mirror 3 is defined as an angle in the clockwise direction with respect to the normal direction N0. The incidence angle represents the angle of incidence. The reflection angle represents the angle of reflection. In this case, the reflection angle $\theta r$ can be expressed using Equation (1) given below.

$$\theta r = \theta i + 2\alpha \quad (1)$$

In the first embodiment, the angular magnification unit 4 is an optical system configured that, as illustrated in FIG. 4, the light emitted from the first scanning mirror 3 during the previous reflection is returned to the substantially identical point on the first scanning mirror 3. Then the light is emitted from the first scanning mirror 3 at the reflection angle $\theta r$ during the previous reflection. The light is incident at the incidence angle $\theta i$ at the time the light is returned to the first scanning mirror 3. The incidence angle $\theta i$ has the same measure as the reflection angle $\theta r$. Accordingly, at the n-th time of reflection (where, n=1, 2, and 3), regarding the incidence angle $\theta i(n)$ and the reflection angle $\theta r(n)$, the following holds true.

when n=1, $\theta i(1) = \theta 0$ (initial incidence angle)

$\theta r(1) = \theta i(1) + 2\alpha = \theta 0 + 2\alpha$ when n=2, $\theta i(2) = \theta r(1) = \theta 0 + 2\alpha$ $\theta r(2) = \theta i(2) + 2\alpha = \theta 0 + 4\alpha$ when n=3, $\theta i(3) = \theta r(2) = \theta 0 + 4\alpha$ $\theta r(3) = \theta i(3) + 2\alpha = \theta 0 + 6\alpha$ Thus, the incidence angle $\theta i(n)$ and the reflection angle $\theta r(n)$ can be expressed using Equation (2) and Equation (3) given below.

$$\theta i(n) = \theta 0 + 2(n-1)\alpha \quad (2)$$

$$\theta r(n) = \theta 0 + 2n\alpha \quad (3)$$

Figure 5:
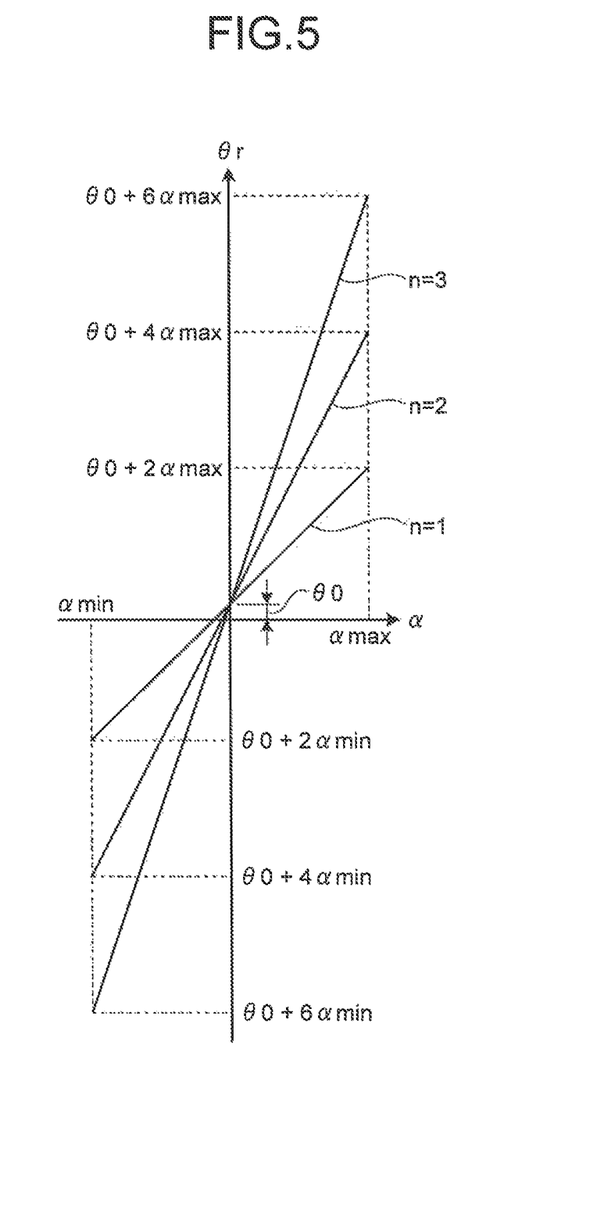
FIG. 5 is a graph illustrating a correlation, which is related to the reflection of light from the first scanning mirror illustrated in FIG. 1, between the inclination angle of the first scanning mirror and an outgoing angle of light from the angular magnification unit for each reflection count.

According to Equation (3), when the light is repetitively reflected from the first scanning mirror 3 for m number of times (n=m), it is clear that the reflection angle $\theta r$ increases by 2(m−1)·α as compared to the reflection occurring only once (n=1). FIG. 5 is a graph illustrating a correlation between the inclination angle α (the horizontal axis) and the reflection angle θr (the vertical axis). Accompanying the vibration (oscillation) of the first scanning mirror 3, the inclination angle α varies within the range of αmin≤α≤αmax. Herein, the angular magnification unit 4 is configured in such a way that, regardless of the inclination angle α, the light is emitted from the first scanning mirror 3 after being reflected for n number of times. Therefore, it can be understood from FIG. 5 that, due to the angular magnification unit 4, the variation range of the reflection angle θr is expanded according to the reflection count n, and a state can be achieved in which the reflection angle θr varies in a linear manner corresponding to the variation in the inclination angle α (αmin≤α≤αmax) of the first scanning mirror 3, regardless of the reflection count n. Meanwhile, in the graph illustrated in FIG. 5, the scale of the vertical axis is half the scale of the horizontal axis.

In FIGS. 2 and 3 are illustrated examples of the optical paths in the angular magnification unit 4 in which the reflection count n is set to three. In FIG. 2 is illustrated a side view of the angular magnification unit 4 and the optical paths when viewed from the Y direction. In FIG. 3 is illustrated a side view of the angular magnification unit 4 and the optical paths when viewed from the X direction. Herein, the X direction is an example of a second direction, while the Y direction is an example of a first direction.

With reference to FIG. 2, the light being incident for the first time on the first scanning mirror 3 follows an optical path Pi1. The light emitted from the light source 2 (see FIG. 1) follows the optical path Pi1 and is incident on the lens 41 from a position close to an optical axis C of the lens 41. In the lens 41, the light enters from a surface 41a and is emitted from a surface 41b. Then, the light is incident on the first scanning mirror 3, which is positioned at the focal point of the lens 41. Meanwhile, the optical axis C of the lens 41 and the optical axis C of the lens 42 are set in a coaxial manner.

The first-time reflected light from the first scanning mirror 3 follows an optical path Pr1. The reflection angle θr of the reflected light, that is, the optical path Pr1 of the reflected light is determined according to Equation (3) given earlier. Due to the inclination of the first scanning mirror 3 by the inclination angle α, the optical path Pr1 is formed on the lower side of the optical path Pi1 with reference to FIG. 2. The light that follows the optical path Pr1 and is emitted from the lens 41 from the surface 41a enters the lens 42 from a surface 42a. Then, that light is emitted from the lens 42 from a surface 42b and is incident on the mirror 43. Herein, the mirror 43 is positioned at the focal point of the lens 42.

The first-time reflected light from the mirror 43 follows an optical path Pi2. The mirror 43 is configured in such a way that the incidence angle and the reflection angle are substantially coincident when viewed from the X direction (from viewpoint used in FIG. 2). Consequently, the optical path Pi2 becomes substantially axisymmetric with the optical path Pr1 with respect to the optical axis C. Subsequently, the light following the optical path Pi2 is incident on the first scanning mirror 3 via the lenses 42 and 41 in that order. Regarding the light following the optical path Pi2, the reflected light from the first scanning mirror 3 follows the optical path Pr2 and is incident on the mirror 43 via the lenses 41 and 42 in that order. Regarding the light following the optical path Pr2, the reflected light from the mirror 43 follows an optical path Pi3 and is incident on the first scanning mirror 3 via the lenses 42 and 41 in that order. Regarding the light following the optical path Pi3, the reflected light from the first scanning mirror 3 is reflected from the second scanning mirror 5 before being incident on the lens 41, and then is emitted from the angular magnification unit 4. That is, in the first embodiment, the light that has been reflected thrice from the first scanning mirror 3 is emitted from the angular magnification unit 4. Meanwhile, the second scanning mirror 5 extends along the X direction.

As illustrated in FIG. 2, when viewed from the Y direction, at positions (space) in between the lenses 41 and 42, the optical paths Pi1, Pr1, Pi2, Pr2, and Pi3 are parallel to the optical axis C of the lenses 41 and 42. The direction parallel to the optical axis C and going toward the lens 41 from the lens 42 (i.e., the opposite direction to the Z direction) is an example of a third direction. Moreover, the direction parallel to the optical axis C and going toward the lens 42 from the lens 41 (i.e., the Z direction) is an example of the opposite direction to the third direction. The Z direction is orthogonal to (intersects with) the X direction as well as the Y direction. When viewed from the Y direction, the lens 41 deflects the light, which is travelling in the opposite direction to the Z direction, toward the first scanning mirror 3; and deflects the reflected light from the first scanning mirror 3 in the Z direction. Herein, the lens 41 is an example of a first portion. Moreover, when viewed from the Y direction, the lens 42 deflects the light, which is travelling in the Z direction, toward the mirror 43. Then, the mirror 43 reflects the light, which has entered from the lens 42, toward the lens 42. Subsequently, the lens 42 deflects the reflected light from the mirror 43 in the opposite direction to the Z direction. Herein, the lens 42 and the mirror 43 are examples of a second portion.

As illustrated in FIG. 3, when viewed from the X direction too, each time the light is reflected from the first scanning mirror 3, there is variation in the optical paths Pi1, Pr1, Pi2, Pr2, Pi3, and Pr3 in the angular magnification unit 4. When viewed from the X direction (from viewpoint used in FIG. 3), the reflecting surface of the first scanning mirror 3 is placed almost perpendicular to the optical axis C of the lenses 41 and 42. Moreover, when viewed from the X direction (from viewpoint used in FIG. 3), the reflecting surface of the mirror 43 is disposed so that the mirror 43 tilts away at an angle β (a tilt angle) from an orthogonal line with respect to the optical axis C. As a result, when viewed from the X direction too, in an identical manner to the viewpoint from the Y direction (see FIG. 2), there is variation in the optical paths Pi1, Pr1, Pi2, Pr2, Pi3, and Pr3 according to the reflection count n. Meanwhile, when viewed from the X direction, as long as at least one of the first scanning mirror 3 and the mirror 43 is tilted away from a direction perpendicular to the Z direction, it serves the purpose. Moreover, in the example illustrated in FIG. 3, the light outgoing position of the optical path Pi1 is placed on the optical axis C from viewpoint in the X direction.

As illustrated in FIG. 3, when viewed from the X direction too, at positions (space) in between the lenses 41 and 42, the optical paths Pi1, Pr1, Pi2, Pr2, and Pi3 are parallel to the optical axis C of the lenses 41 and 42. When viewed from the X direction, the lens 41 deflects the light, which is travelling in the opposite direction to the Z direction, toward the first scanning mirror 3; and deflects the reflected light from the first scanning mirror 3 in the Z direction. Moreover, when viewed from the X direction, the lens 42 deflects the light, which is travelling in the Z direction, toward the mirror 43. Then, the mirror 43 reflects the light, which is incident from the lens 42, back toward the lens 42. Subsequently, the lens 42 deflects the reflected light from the mirror 43 in the opposite direction of the Z direction. Meanwhile, in the first embodiment, the lenses 41 and 42 have an identical configuration (specifications). Thus, by sharing the components, the manufacturing cost can be reduced.

Figure 6:
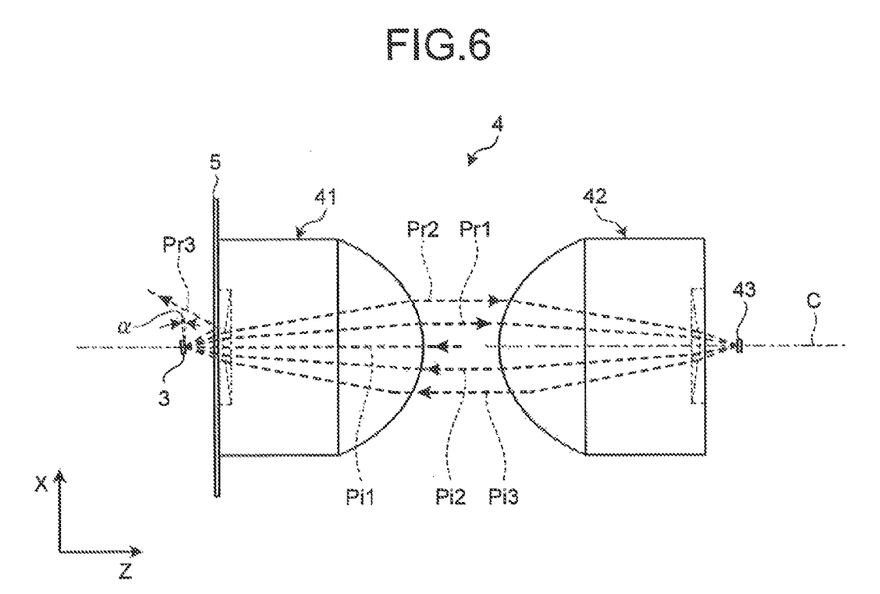
FIG. 6 is a side view, when viewed from the Y direction, of the angular magnification unit illustrated in FIG. 1, and is a diagram illustrating optical paths at predetermined inclination angles of the first scanning mirror.
Figure 7:
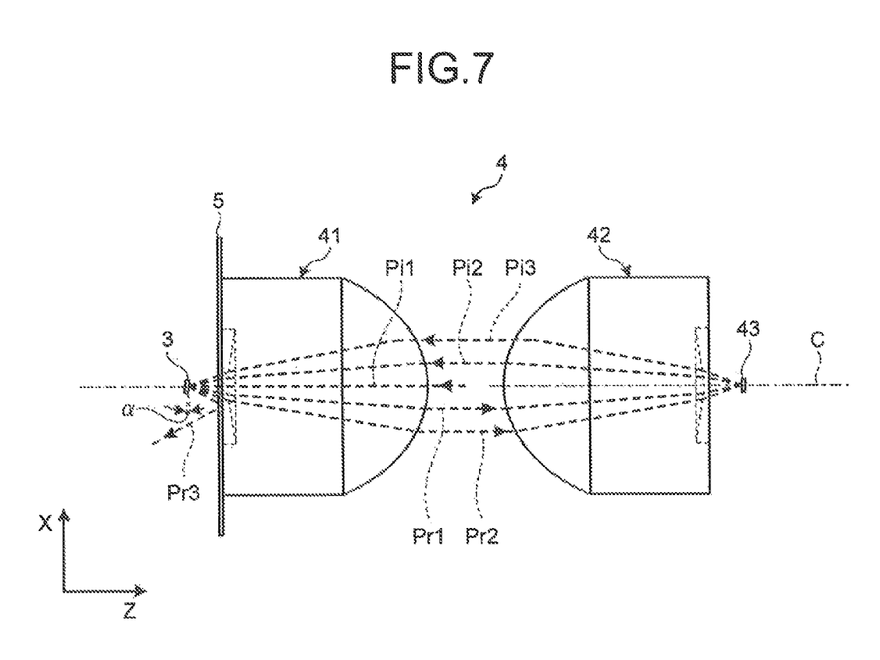
FIG. 7 is a side view, when viewed from the Y direction, of the angular magnification unit illustrated in FIG. 1, and is a diagram illustrating optical paths at different inclination angles of the first scanning mirror than in FIG. 6.
Figure 8:
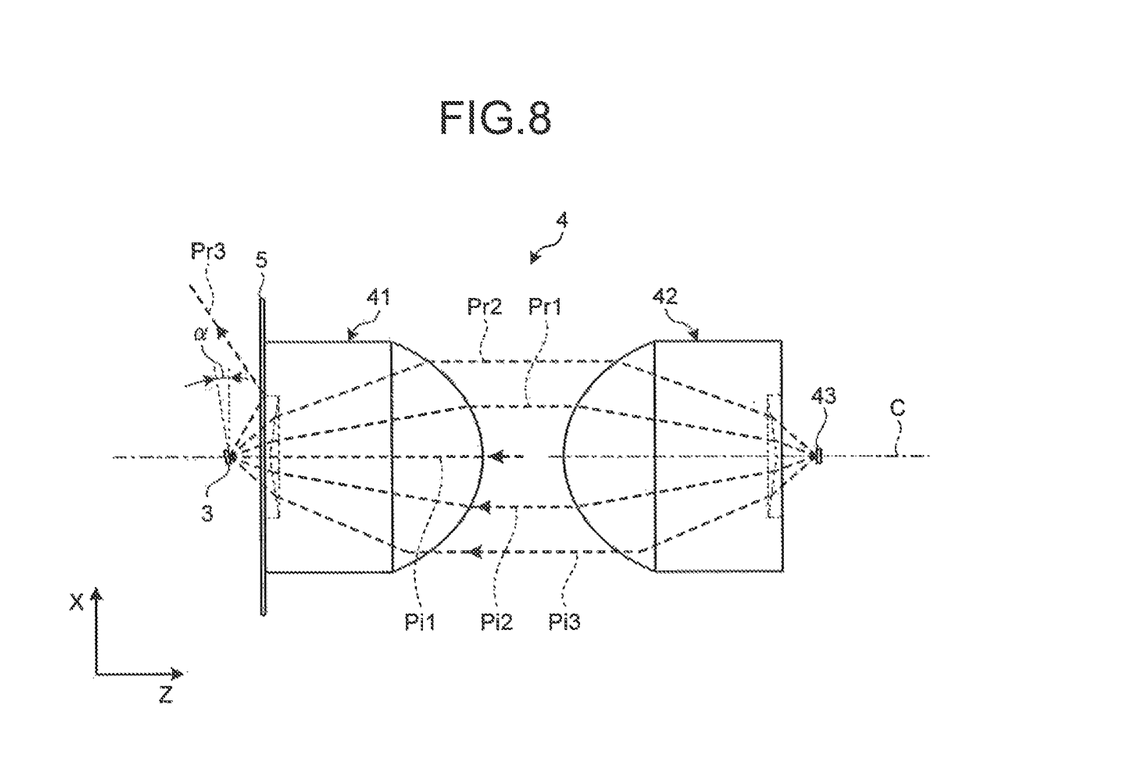
FIG. 8 is a side view, when viewed from the Y direction, of the angular magnification unit illustrated in FIG. 1, and is a diagram illustrating optical paths at different inclination angles of the first scanning mirror than in FIGS. 6 and 7.

In the first embodiment, for the purpose of light beam scanning in the X direction, the inclination angle α of the first scanning mirror 3 from viewpoint in the Y direction illustrated in FIG. 2 changes over time. In FIGS. 6 to 8 are illustrated the optical paths Pi1, Pr1, Pi2, Pr2, Pi3, and Pr3 from viewpoint in the Y direction in the angular magnification unit 4 in three cases of having different inclination angles α of the first scanning mirror 3. With reference to FIGS. 6 to 8, it can be understood that the angle of the outgoing light from the angular magnification unit 4 changes according to the inclination angle α of the first scanning mirror 3.

In contrast, in the first embodiment, when viewed from the X direction illustrated in FIG. 3, the light always almost follows the optical paths Pi1, Pr1, Pi2, Pr2, Pi3, and Pr3 illustrated in FIG. 3 regardless of the temporal changes in the inclination angle α of the first scanning mirror 3.

As illustrated in FIGS. 2 and 3, the second scanning mirror 5 extends in the X direction, but is short in the Y direction. In the first embodiment, as illustrated in FIG. 3, the second scanning mirror 5 is positioned in such a way that it swerves off the optical paths Pi1, Pr1, Pi2, Pr2, and Pi3 resulting from the light being reflected from the first scanning mirror 3 less than thrice, but overlaps with the optical path Pr3 (blocks the optical path Pr3) resulting from the light being reflected from the first scanning mirror 3 thrice. As a result, in the first embodiment, the light that has reflected thrice (reflected for a predetermined number of times) from the first scanning mirror 3 can be retrieved at the second scanning mirror 5. That is, in the first embodiment, if the angular magnification unit 4 is configured in such a way that, when viewed from the X direction, the light follows the substantially fixed optical paths Pi1, Pr1, Pi2, Pr2, Pi3, and Pr3 regardless of the inclination angle α; then it becomes possible to achieve a configuration in which the light comes out only after being reflected for a predetermined n number of times. Meanwhile, the second scanning mirror 5 is an example of a light retrieving unit.

However, in such a configuration, in case the optical paths Pr1, Pi2, Pr2, Pi3, and Pr3 interfere with the optical components disposed at the upstream side of the optical path Pi1, it is not possible to retrieve the light. The optical components are, for example, the light source 2 or mirrors (not illustrated). In that regard, in the first embodiment, the angular magnification unit 4 is configured in such a way that, when viewed from the X direction illustrated in FIG. 3, at least the optical path Pr1 and the optical path Pi1 swerve off (stay out of alignment with or do not overlap with) each other, and that the optical path Pr1 also swerves off (stays out of alignment with or does not overlap with) the optical paths Pi2, Pr2, Pi3, and Pr3. As a result, the light following the optical paths Pr1, Pi2, Pr2, Pi3, and Pr3 is prevented from interfering with the optical components disposed at the upstream side of the optical path Pi1. Hence, the light can be retrieved with more certainty. Meanwhile, the optical components disposed at the upstream side of the optical path Pi1 can be supported by the lenses 41 and 42 either directly or indirectly via a bracket or the like. Alternatively, those optical components can be supported by a structure (such as a protrusion formed on a case) that extends substantially along a direction intersecting the plane of FIG. 3 (for example, the perpendicular direction to the plane of FIG. 3, or the X direction). From viewpoint used in FIG. 3, the structure can be configured to swerve off (to stay out of alignment with or not to overlap with) the optical paths Pr1, Pi2, Pr2, and Pi3.

As described above, in the first embodiment, the angular magnification unit 4 is configured in such a way that, when viewed from the Y direction (the first direction), the reflected light from the first scanning mirror 3 (the first mirror) is returned to the first scanning mirror 3 so that the light is reflected at substantially the same points on the first scanning mirror 3 for a plural number of times; and in such a way that, when viewed from the Y direction, each time the light is reflected from the first scanning mirror 3, there is an increase in the angle θr between the normal direction Nα of a reflecting surface 3a and the reflection direction of the light. Moreover, before being emitted from the angular magnification unit 4, the light gets reflected for a predetermined n number of times (for example, thrice) from the first scanning mirror 3. That is, according to the first embodiment, the angular magnification unit 4 is configured in such a way that the light gets reflected for a plurality of number of times from the first scanning mirror 3. Thus, as compared to a configuration in which the light is reflected only once from the first scanning mirror 3, the outgoing angle of the light from the angular magnification unit 4 can be increased. Consequently, according to the first embodiment, the range of the deflection angle of light increases as compared to a configuration in which, for example, the angular magnification unit 4 is not disposed. Moreover, according to the first embodiment, as compared to a configuration in which, for example, the same range of the deflection angle of light is achieved without using the angular magnification unit 4, not only a smaller angular variation of the first scanning mirror 3 can be set with ease but also a higher vibrational frequency (a shorter cycle) of the first scanning mirror 3 can be set with ease. Furthermore, in the first embodiment, the angular magnification unit 4 is configured in such a way that, when viewed from the Y direction, the light gets reflected for a plurality of number of times from the substantially identical position on the first scanning mirror 3. Consequently, according to the first embodiment, as compared to a configuration in which, for example, the light gets reflected for a plurality of number of times from different positions on the first scanning mirror 3 when viewed from the Y direction; the first scanning mirror 3 as well as the angular magnification unit 4 can be easily configured to be smaller in size. Therefore, for example, the first scanning mirror 3 becomes able to move at high speeds without difficulty, as well as the vibrational frequency of the first scanning mirror 3 can be set to a higher level without difficulty.

Meanwhile, in a configuration in which the light being emitted from a scanning mirror is passed through a lens so as to expand the range of the deflection angle (the degree of vibration) of the light due to refraction at the lens, the lens characteristics (the Etendue conservation theorem and the Lagrange invariant) cause a decrease in the optical diameter (the beam diameter) in return for the expansion in the range of the deflection angle. As a result, the desired performance may be difficult to achieve. In that regard, according to the first embodiment, since the configuration is not meant to achieve expansion in the range of the deflection angle of light using the refraction of light at a lens, no such issue arises readily.

Moreover, in the first embodiment, the angular magnification unit 4 is configured in such a way that, each time the light is reflected from the first scanning mirror 3, the optical path of the reflected light changes when viewed from the X direction (the second direction) that intersects with the Y direction (the first direction). If, at all inclination angles α, the optical paths of the light incident on the first scanning mirror 3 and the optical paths of the light reflected from the first scanning mirror 3 lie on the same plane; then it becomes difficult to retrieve the light, which has been reflected for a predetermined number of times from the first scanning mirror 3, from that plane at each inclination angle α. In that regard, according to the first embodiment, each time the light is reflected from the first scanning mirror 3, the optical path of the reflected light changes when viewed from the X direction (the second direction). As a result, the optical path resulting from the light being reflected from the first scanning mirror 3 less than a predetermined number of times is spatially separated from the optical path resulting from the light being reflected from the first scanning mirror 3 for a predetermined number of times. Consequently, according to the first embodiment, for example, the light that has been reflected for a predetermined number of times from the first scanning mirror 3 can be retrieved with ease.

Furthermore, in the first embodiment, the angular magnification unit 4 is configured in such a way that, when viewed from the X direction (the second direction), the reflected light from the first scanning mirror 3 (the first mirror) is returned to the first scanning mirror 3 so that the light is reflected at substantially the same points on the first scanning mirror 3 for a plural number of times; and in such a way that, when viewed from the X direction, each time the light is reflected from the first scanning mirror 3, there is an increases in the angle between the normal direction of the first scanning mirror 3 and the reflection direction of the light. That is, according to the first embodiment, the angular magnification unit 4 is configured in such a way that, when viewed from the X direction, the light is reflected for a plurality of number of times from the substantially identical point on the first scanning mirror 3. Consequently, according to the first embodiment, as compared to a configuration in which, for example, the light gets reflected for a plurality of number of times from different positions on the first scanning mirror 3 when viewed from the X direction; the first scanning mirror 3 as well as the angular magnification unit 4 can be easily configured to be smaller in size. Therefore, for example, the first scanning mirror 3 becomes able to move at high speeds with ease, as well as the vibrational frequency of the first scanning mirror 3 can be set to a higher level with ease.

Moreover, in the first embodiment, the angular magnification unit 4 is configured in such a way that, when viewed from the X direction (the second direction), the optical paths are substantially fixed regardless of the variation in the normal direction of the first scanning mirror 3 (the first mirror). Therefore, according to the first embodiment, for example, the light that has been reflected for a predetermined number of times from the first scanning mirror 3 can be retrieved with ease.

Furthermore, in the first embodiment the angular magnification unit 4 is configured in such a way that, when viewed from the X direction (the second direction), at least the optical path Pi1 of the light incident on the first scanning mirror 3 (the first mirror) before the light is reflected from the first scanning mirror 3 for a predetermined number of times, swerves off the optical path Pr1 of the reflected light of the light incident on the first scanning mirror 3. Therefore, according to the first embodiment, for example, the light following the optical path Pr1 of the first scanning mirror 3 can be prevented from interfering with the optical components disposed at the upstream side of the optical path Pi1.

Moreover, in the first embodiment, when viewed from the X direction (the second direction), the second scanning mirror 5 (the light retrieving unit) is positioned in such a way that it lies on the optical path Pr3 resulting from the light being reflected from the first scanning mirror 3 for a predetermined number of times (the first mirror), but swerves off the optical paths Pi1, Pr1, Pi2, Pr2, and Pi3 resulting from the light being reflected from the first scanning mirror 3 less than a predetermined number of times. Consequently, according to the first embodiment, for example, the light that has been reflected for a predetermined number of times from the first scanning mirror 3 can be retrieved with ease.

Furthermore, in the first embodiment, the angular magnification unit 4 includes the lens 41 (the first portion) that deflects the light travelling to the opposite direction of the Z direction (i.e., travelling to the third direction) toward the first scanning mirror 3 (the first mirror) and deflects the reflected light from the first scanning mirror 3 in the Z direction; and includes the lens 42 and the mirror 43 (the second portion) that deflect the light travelling in the Z direction to the opposite direction of the Z direction. Hence, according to the first embodiment, for example, the angular magnification unit 4, in which the reflected light from the first scanning mirror 3 is incident again on the first scanning mirror 3, can be configured with relative simplicity.

Moreover, in the first embodiment, the angular magnification unit 4 includes the mirror 43 (the second mirror) that, when viewed from the X direction (the second direction), is disposed so that the mirror 43 is tilted away from a direction perpendicular to the opposite direction of the Z direction (i.e., with respect to the orthogonal direction to the third direction). Hence, according to the first embodiment, for example, the configuration that enables variation in the optical paths as illustrated in FIG. 3 can be achieved with relative simplicity.

Furthermore, in the first embodiment, the mirror 43 (the second mirror) is disposed independently of the first scanning mirror 3. Hence, according to the first embodiment, for example, the first scanning mirror 3 as well as the mirror 43 can be adjusted with more ease or with more accuracy.

Second Embodiment

Figure 9:
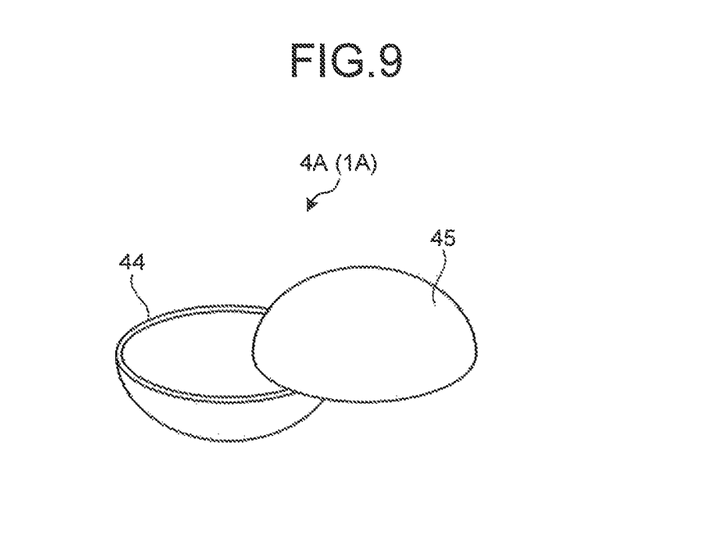
FIG. 9 is a perspective view of an angular magnification unit in the light beam scanner according to a second embodiment.
Figure 10:
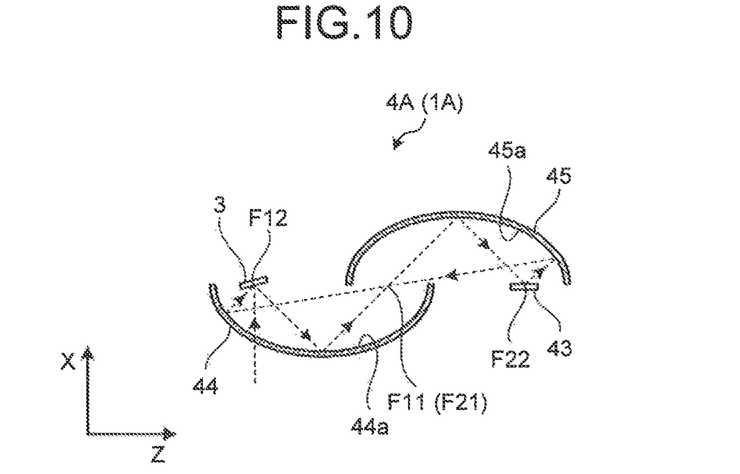
FIG. 10 is a side view, when viewed from the Y direction, of the angular magnification unit illustrated in FIG. 9.

As illustrated in FIGS. 9 and 10, in a projector 1A according to a second embodiment, the configuration of an angular magnification unit 4A is different than the first embodiment. The angular magnification unit 4A includes the first scanning mirror 3, a mirror 44, a mirror 45, and the mirror 43. In the second embodiment too, the first scanning mirror 3 is an example of the first mirror, and the mirror 43 is an example of the second mirror.

The mirror 44 is a concave mirror having a reflecting surface 44a that is depressed toward one side (the lower side in FIGS. 9 and 10); while the mirror 45 is a concave mirror having a reflecting surface 45a that is depressed toward the other side (the upper side in FIGS. 9 and 10). The reflecting surfaces 44a and 45a have an identical shape (are congruent), and represent ellipsoids of revolution around the rotation center (not illustrated) along the Z direction. One focal point F11 of the mirror 44 overlaps with one focal point F21 of the mirror 45. Moreover, at another focal point F12 of the mirror 44, the first scanning mirror 3 is positioned. Furthermore, at another focal point F22 of the mirror 45, the mirror 43 is positioned. The focal points F11 (F21), F12, and F22 are positioned in alignment (not illustrated) with the Z direction. When the movable unit (not illustrated) of the first scanning mirror 3 oscillates (vibrates) around the rotation center along the Y direction; although the optical path differs according to the orientation (angle) of the first scanning mirror 3, as illustrated by the dotted line in FIG. 10, the reflected light from the first scanning mirror 3 gets reflected from the reflecting surfaces 44a and 45a in that order before being incident on the mirror 43, and then the reflected light from the mirror 43 gets reflected from the reflecting surfaces 45a and 44a in that order before returning to the first scanning mirror 3. Meanwhile, in between the reflecting surfaces 44a and 45a, the light either passes through the focal point F11 (F21) or passes adjacent to the focal point F11 (F21). Moreover, in the second embodiment too, each time the light is reflected from the first scanning mirror 3, the incidence angle of light and the reflection angle of light in the first scanning mirror 3 vary according to Equation (2) and Equation (3) given earlier and as illustrated in FIG. 5. Furthermore, in the second embodiment too, the angle of the mirror 43 is set in such a way that, each time the light is reflected from the first scanning mirror 3, there is variation in the optical paths when viewed from the X direction (not illustrated). Moreover, the second scanning mirror 5 is positioned on the optical path resulting from the light being reflected from the first scanning mirror 3 for a predetermined number of times. In this way, although the configuration of the angular magnification unit 4A is different than the first embodiment, the functionality and the effect achieved in the first embodiment can be achieved in an identical manner in the second embodiment too.

Third Embodiment

Figure 11:
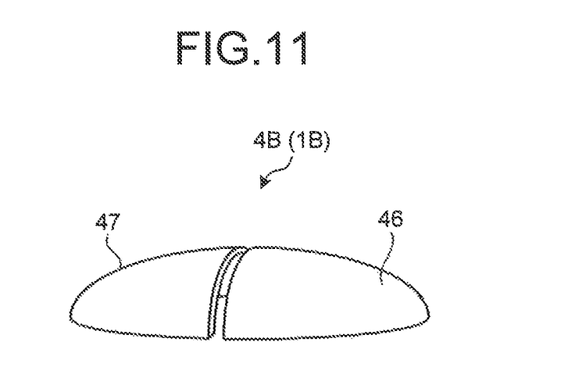
FIG. 11 is a perspective view of an angular magnification unit in the light beam scanner according to a third embodiment.
Figure 12:
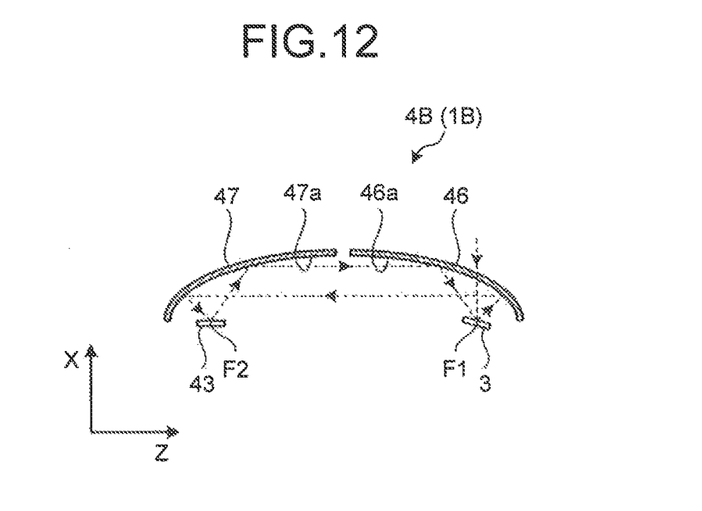
FIG. 12 is a side view, when viewed from the Y direction, of the angular magnification unit illustrated in FIG. 11.

As illustrated in FIGS. 11 and 12, in a projector 13 according to a third embodiment, the configuration of an angular magnification unit 4B is different than the first and second embodiments. The angular magnification unit 4B includes the first scanning mirror 3, a mirror 46, a mirror 47, and the mirror 43. In the third embodiment too, the first scanning mirror 3 is an example of the first mirror, and the mirror 43 is an example of the second mirror.

The mirror 46 is a concave mirror having a reflecting surface 46a that is depressed toward one side (the upper side in FIGS. 11 and 12); while the mirror 47 is a concave mirror having a reflecting surface 47a that is depressed toward the same side (the upper side in FIGS. 11 and 12). The reflecting surfaces 46a and 47a have an identical shape (are congruent), and represent paraboloids of revolution around the rotation center along the Z direction. A focal point F1 of the mirror 46 and a focal point F2 of the mirror 47 are arranged in alignment (not illustrated) with the Z direction. When the movable unit (not illustrated) of the first scanning mirror 3 oscillates (vibrates) around the rotation center along the Y direction; although the optical path differs according to the orientation (angle) of the first scanning mirror 3, as illustrated in FIG. 12, the reflected light from the first scanning mirror 3 gets reflected from the reflecting surfaces 46a and 47a in that order before being incident on the mirror 43, and then the reflected light from the mirror 43 gets reflected from the reflecting surfaces 47a and 46a in that order before returning to the first scanning mirror 3. Meanwhile, in between the reflecting surfaces 46a and 47a, the light passes along the Z direction. Moreover, in the third embodiment too, each time the light is reflected from the first scanning mirror 3, the incidence angle of light and the reflection angle of light in the first scanning mirror 3 vary according to Equation (2) and Equation (3) given earlier and as illustrated in FIG. 5. Furthermore, in the third embodiment too, the angle of the mirror 43 is set in such a way that, each time the light is reflected from the first scanning mirror 3, there is variation in the optical paths when viewed from the X direction (not illustrated). Moreover, the second scanning mirror 5 is positioned on the optical path resulting from the light being reflected from the first scanning mirror 3 for a predetermined number of times. In this way, although the configuration of the angular magnification unit 4B is different than the first and second embodiments, the functionality and the effect achieved in the first and second embodiments can be achieved in an identical manner in the third embodiment too.

Fourth Embodiment

Figure 13:
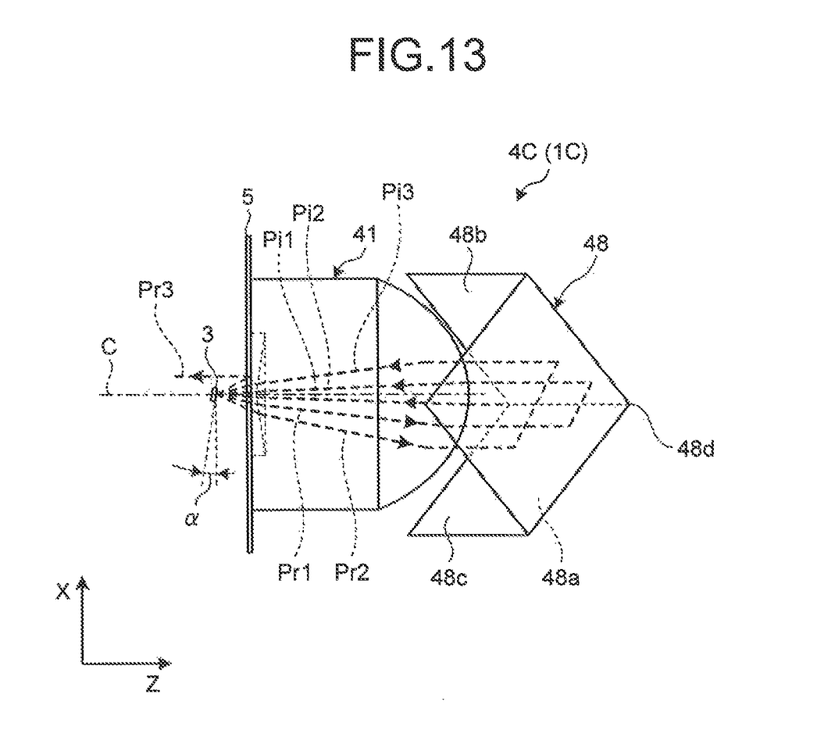
FIG. 13 is a perspective view of an angular magnification unit in the light beam scanner according to a fourth embodiment.

As illustrated in FIG. 13, in a projector IC according to a fourth embodiment, the configuration of an angular magnification unit 4C is different than the first to third embodiments. The angular magnification unit 4C includes the first scanning mirror 3, the lens 41, and a mirror 48.

The first scanning mirror 3 and the lens 41 are identical to the first embodiment. That is, the reflected light from the first scanning mirror 3 passes through the lens 41 and gets deflected in the Z direction. The mirror 48 is disposed in place of the lens 42 and the mirror 43 according to the first embodiment. The mirror 48 has three reflecting surfaces 48a, 48b, and 48c that mutually intersect at right angles. In the fourth embodiment, a point of intersection 48d of the reflecting surfaces 48a, 48b, and 48c is slightly out of alignment with respect to the optical axis C in the Y direction. When viewed from the Y direction (from viewpoint used in FIG. 13), the mirror 48 having the abovementioned configuration deflects the light, which comes from the lens 41 and which travels from a first side to a second side in the Z direction (from the left-hand side to the right-hand side in FIG. 13), toward the lens 41 from the second side to the first side in the Z direction. As a result, the mirror 48 functions in an identical manner to the lens 42 and the mirror 43 according to the first embodiment. Herein, the mirror 48 is an example of the second mirror as well as an example of the second portion. In this way, although the configuration of the angular magnification unit 4C is different than the first to third embodiments, the functionality and the effect achieved in the first to third embodiments can be achieved in an identical manner in the fourth embodiment too.

Fifth Embodiment

Figure 14:
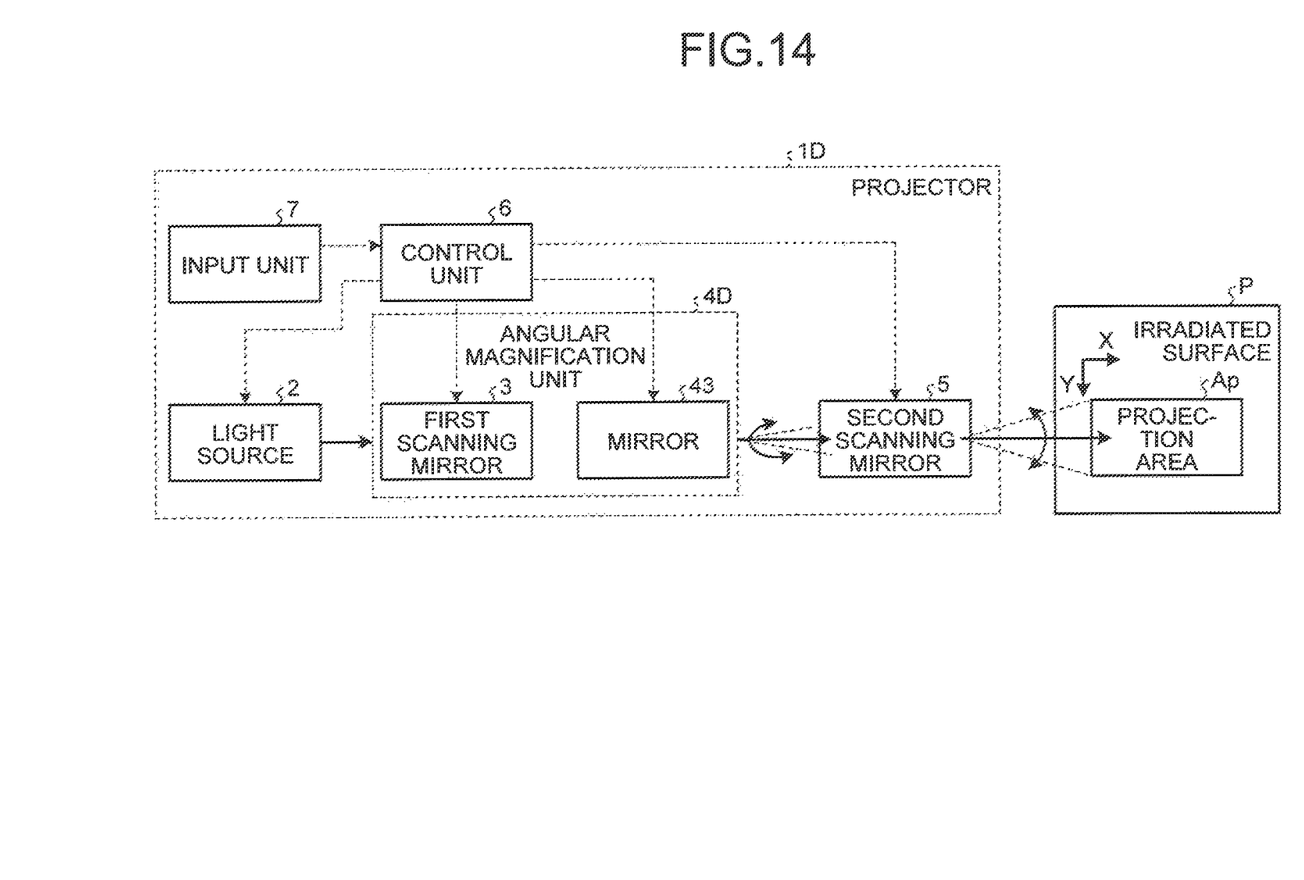
FIG. 14 is an explanatory diagram illustrating an overall configuration of a light beam scanner according to a fifth embodiment.

According to a fifth embodiment, a projector 1D illustrated in FIG. 14 has an identical configuration to the first embodiment. However, an angular magnification unit 4D according to the fifth embodiment is configured in such a way that, when viewed from the X direction, the mirror 43 that varies the optical path each time the light is reflected from the first scanning mirror 3 is set to have a adjustable inclination angle β (orientation, see FIG. 3). Herein, the inclination angle β of the mirror 43 is electrically varied according to control signals sent by the control unit 6. Smaller the angle between the normal direction of the mirror 43 and the optical axis C, the smaller is the angular variation of the optical path at the mirror 43 when viewed from the X direction. That results in an increase in the reflection count before the reflected light from the first scanning mirror 3 reaches the second scanning mirror 5. Greater the increase in the reflection count, the greater becomes the variation range of the reflection angle θr in the angular magnification unit 4D. However, in contrast, greater the angle between the normal direction of the mirror 43 and the optical axis C, the greater is the angular variation of the optical path at the mirror 43 when viewed from the X direction. That results in a decrease in the reflection count before the reflected light from the first scanning mirror 3 reaches the second scanning mirror 5. Greater the decrease in the reflection count, the smaller becomes the variation range of the reflection angle θr in the angular magnification unit 4D. For example, when the reflection count n is equal to three, it is clear from Equation (2), Equation (3), and FIG. 5 that the angular range is half as large again as the reflection count n equal to two. In this way, according to the fifth embodiment, by varying the inclination angle of the mirror 43 (the second mirror), the magnification percentage of angles due to the angular magnification unit 4D can be varied. Meanwhile, the mirror 43 can be configured in such a way that the inclination angle thereof can be varied manually.

The first to fifth embodiments can also be implemented by replacing the configurations and shapes. Furthermore, the first to fifth embodiments can be implemented by changing, as appropriate, the specifications (e.g., structure, type, direction, shape, size, length, width, thickness, height, number, arrangement, position, material, color, transparency, index of refraction, reflectance) of the configurations and shapes.

For example, in an angular magnification unit, the configuration of returning the reflected light from a first mirror to the first mirror can be achieved using an optical system (optical components) other than the embodiments described above. Moreover, the position of the light retrieving unit can be set in various ways. Furthermore, for example, if the first mirror is disposed so that the first mirror is tilted away from a direction perpendicular to the third direction when viewed from the X direction, then the first mirror can be made to function as a second mirror too.

Moreover, the second scanning mirror can be disposed independent of the light retrieving unit. In that case, for example, a fixed mirror that does not vibrate or oscillate is disposed as the light retrieving unit, and the second scanning mirror that is oscillating (vibrating) in nature is disposed subsequent to the light retrieving unit.

Furthermore, in between the light retrieving unit and the second scanning mirror, it is possible to dispose a light collecting unit (a light converging unit) such as a lens or a mirror. In that case, the second scanning mirror can be further downsized. Moreover, subsequent to the second scanning mirror, it is possible to dispose a lens that expands the range of the deflection angle of light due to refraction of light.

Figure 15:
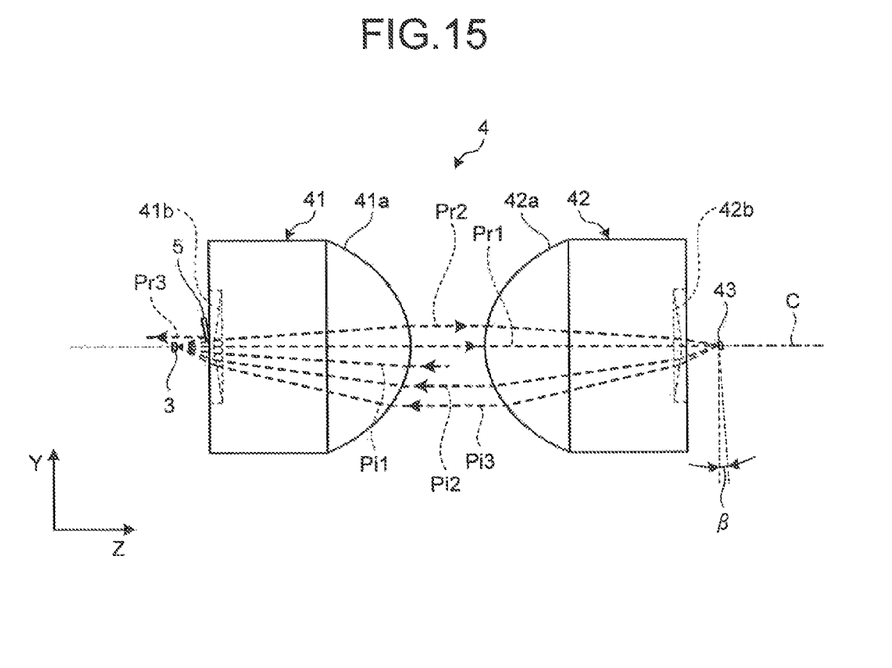
FIG. 15 is a side view, when viewed from the X direction, of the angular magnification unit in the light beam scanner according to a modification example of the first embodiment.

Furthermore, as illustrated in FIG. 15, according to a modification example of the first embodiment, the configuration can be such that, when viewed from the X direction, the light outgoing position of the optical path Pi1, which carries the light incident for the first time on the lens 41, swerves off (is out of alignment with or does not overlap with) the optical axis C. In that case too, the angles of the mirrors 3 and 43 are set in such a way that the optical components disposed at the upstream side of the optical path Pi1 swerve off (are out of alignment with or do not overlap with) at least the optical path Pr1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to covet such forms or modifications as would fall within the scope and spirit of the inventions.

What is claimed is:

1. A light beam scanner comprising:
   a first mirror in which a normal direction of a reflecting surface is changed repeatedly; and
   an angular magnification unit, the angular magnification unit being configured to:
   return, when viewed from a first direction, reflected light from the first mirror to the first mirror so that light is reflected at substantially the same points on the first mirror for a plural number of times, and
   increase, when viewed from the first direction, an angle each time light is reflected from the first mirror, the angle being between the normal direction of the reflecting surface and a reflection direction of light, wherein
   light is emitted from the angular magnification unit after the light is reflected from the first mirror for a predetermined number of times.

2. The light beam scanner according to claim 1, wherein the angular magnification unit is configured to cause, when viewed from a second direction, an optical path of the reflected light to change each time light is reflected from the first mirror, the second direction intersecting the first direction.

3. The light beam scanner according to claim 2, wherein the angular magnification unit is configured to:
   return, when viewed from the second direction, the reflected light from the first mirror to the first mirror so that the light is reflected at substantially the same points on the first mirror for a plural number of times, and
   increase, when viewed from the second direction, the angle between the normal direction and the reflection direction of light each time light is reflected from the first mirror.

4. The light beam scanner according to claim 2, wherein the angular magnification unit is configured to adjust, when viewed from the second direction, an optical path so that the optical path is substantially fixed regardless of variation in a normal direction of the first mirror.

5. The light beam scanner according to claim 4, wherein the angular magnification unit is configured to cause, when viewed from the second direction, at least an optical path of light incident on the first mirror before the light is reflected from the first mirror for a predetermined number of times, and an optical path of reflected light of the light incident on the first mirror to not overlap with each other.

6. The light beam scanner according to claim 2, further comprising a light retrieving unit, the light retrieving unit being disposed, when viewed from the second direction, on an optical path resulting from the light being reflected from the first mirror for a predetermined number of times, the light retrieving unit being disposed, when viewed from the second direction, outside of an optical path resulting from the light being reflected from the first mirror less than a predetermined number of times.

7. The light beam scanner according to claim 1, wherein the angular magnification unit comprises a first portion and a second portion, wherein
   the first portion is configured to cause light travelling in a third direction to deflect toward the first mirror, the first portion being configured to cause the reflected light from the first mirror to deflect in a direction opposite to the third direction, and
   the second portion is configured to cause light travelling in the direction opposite to the third direction, to deflect in the third direction.

8. The light beam scanner according to claim 7, wherein the angular magnification unit comprises a second mirror, the second mirror being disposed so that, when viewed from a second direction, the second mirror is tilted away from a direction perpendicular to the third direction.

9. The light beam scanner according to claim 8, wherein the second mirror is disposed independent of the first mirror.

10. The light beam scanner according to claim 8, wherein a tilt of the second mirror with respect to the third direction is adjustable.

\* \* \* \* \*